United States Patent
Wang

(10) Patent No.: US 8,817,283 B2
(45) Date of Patent: Aug. 26, 2014

(54) TRANSMITTING MODULE AND MULTI-FUNCTIONAL PRINTER USING THE SAME

(75) Inventor: Chih-Hwa Wang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 158 days.

(21) Appl. No.: 13/532,807

(22) Filed: Jun. 26, 2012

(65) Prior Publication Data

US 2013/0148147 A1 Jun. 13, 2013

(30) Foreign Application Priority Data

Dec. 7, 2011 (TW) .............................. 100144961 A

(51) Int. Cl.
*G06F 15/00* (2006.01)
(52) U.S. Cl.
USPC .......................................................... 358/1.13

(58) Field of Classification Search
CPC ...................................................... G06F 3/1297
USPC ........................................................... 358/1.13
See application file for complete search history.

(56) References Cited

U.S. PATENT DOCUMENTS

2008/0211171 A1* 9/2008 Kusumi ........................ 271/225

* cited by examiner

*Primary Examiner* — Saeid Ebrahimi Dehkordy
(74) *Attorney, Agent, or Firm* — Jianq Chyun IP Office

(57) ABSTRACT

A transmitting module and a multi-functional printer (MFP) using the same are provided. The transmitting module includes at least two shafts and a conveyer belt. Each shaft has a circumference surface and multiple first fixing structures, and the first fixing structures are arranged in a row encircling the circumference surface. The conveyer belt encircles the shafts, and the conveyer belt has a body and multiple second fixing structures, where the fixing structures are arranged in a row on a bottom of the body. When the conveyer belt rotates along with the shafts, the second fixing structures engage with the first fixing structures correspondingly.

25 Claims, 3 Drawing Sheets

TRANSMITTING MODULE AND MULTI-FUNCTIONAL PRINTER USING THE SAME

CROSS-REFERENCE TO RELATED APPLICATION

This application claims the priority benefit of Taiwan application serial no. 100144961, filed on Dec. 7, 2011. The entirety of the above-mentioned patent application is hereby incorporated by reference herein and made a part of this specification.

BACKGROUND OF THE INVENTION

1. Field of the Invention

The present invention generally relates to a module and an equipment, in particular, to a transmitting module and a multi-functional printer (MFP) using the transmitting module.

2. Description of Related Art

Along with the coming of the information society, office automation equipment (OAE), such as a scanner, a photocopier, and a printer, is disposed in an office, so that users may perform word processing operations by using the OAEs. It should be noted that, when the various OAEs are disposed in the office at the same time, they occupy a large space. Therefore, a multi-functional printer (MFP) having functions such as photocopying, printing, and scanning integrated has been developed to solve the above problem.

Specifically, a scanning module and a printing module in the MFP all need a conveyer belt and shafts. When the shafts rotate, the conveyer belt is driven to drive the scanning module to rotate, so as to perform scanning, or the conveyer belt carries carbon powder and cooperates with a photoreceptor drum assembly and a transfer roller, so as to perform printing.

However, the conveyer belt is only sleeved on a transmission shaft, so the conveyer belt tends to snake with respect to the shafts in an axial direction of the shafts, and in this way, the scanning result or printing quality may be affected.

SUMMARY OF THE INVENTION

The present invention is directed to a transmitting module, in which a conveyer belt has desired fixity with respect to shafts.

The present invention is further directed to a multi-functional printer (MFP) using the transmitting module.

The present invention provides a transmitting module, which includes at least two shafts and a conveyer belt. Each shaft has a circumference surface and multiple first fixing structures, and the first fixing structures are arranged in a row encircling the circumference surface. The conveyer belt encircles the shafts, and the conveyer belt has a body and multiple second fixing structures, where the fixing structures are arranged in a row on a bottom of the body. When the conveyer belt rotates along with the shafts, the second fixing structures engage with the first fixing structures correspondingly.

In an embodiment of the transmitting module of the present invention, one of the shafts is a driving shaft, and the other one of the shafts is a driven shaft.

In an embodiment of the transmitting module of the present invention, the first fixing structures are protrusions while the second fixing structures are recesses, or the first fixing structures are recesses while the second fixing structures are protrusions. In addition, the protrusions are arranged in a battlement shape. The protrusions are bumps or salient points, and the recesses are blind holes or through holes. Further, the protrusions are of a bilateral symmetrical shape.

In an embodiment of the transmitting module of the present invention, the second fixing structures and the body are formed integrally.

In an embodiment of the transmitting module of the present invention, a material of the conveyer belt is rubber.

The present invention further provides an MFP, which includes a main body, a scanning module, a driving module, and a transmitting module according to any embodiment described above. The scanning module, the driving module and the transmitting module are all disposed in the main body, and the transmitting module is connected between the driving module and the scanning module.

In an embodiment of the MFP of the present invention, a scanning platform disposed in the main body is further provided. The scanning module is located on the scanning platform, the transmitting module is located beside the scanning platform, and the scanning module is suitable for moving with respect to the scanning platform.

The present invention further provides an MFP, which includes a main body, a transmitting module according to any embodiment described above, a photoreceptor drum assembly, and a transfer roller. The transmitting module, the photoreceptor drum assembly, and the transfer roller are all disposed in the main body. The photoreceptor drum assembly and the transfer roller all contact with the conveyer belt, and the photoreceptor drum assembly has no physical contact with the transfer roller.

In an embodiment of the MFP of the present invention, a pick up roller and a paper heating element are further provided, and the transfer roller is located between the pick up roller and the paper heating element.

In view of the above, in the transmitting module of the present invention, the first fixing structures of the shafts and the second fixing structures of the conveyer belt cooperate with each other to enable the conveyer belt and the shafts have desired fixing effect. Therefore, when the transmitting module is operating, the conveyer belt will not snake with respect to the shafts. The MFP using the transmitting module may have desired scanning or printing effect.

In order to make the above features and advantages of the present invention more comprehensible, embodiments are illustrated in detail below through accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
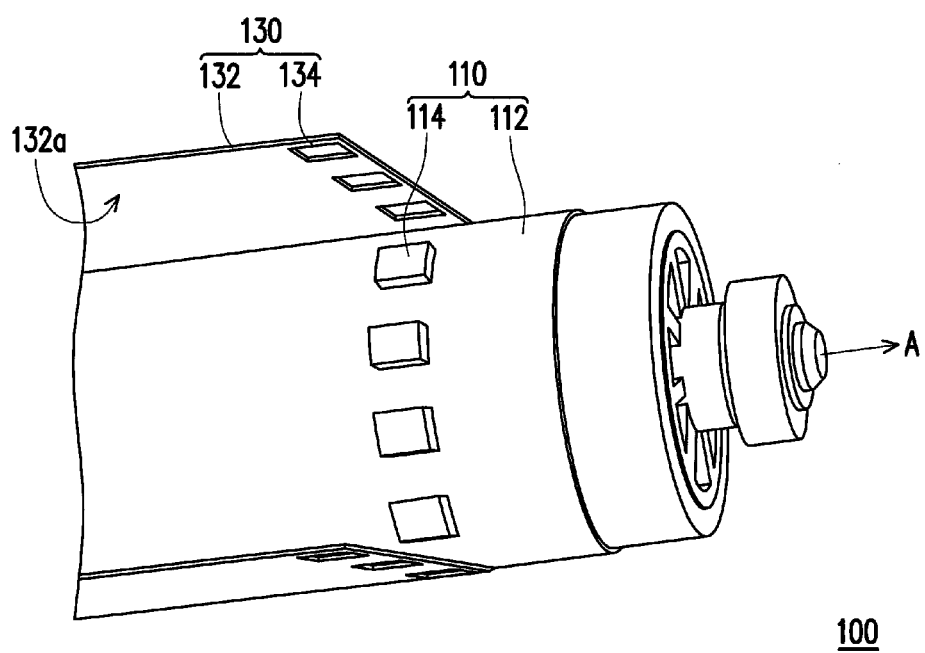
FIG. 1 is a schematic three-dimensional view of a transmitting module according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

First Embodiment

FIG. 1 is a schematic three-dimensional view of a transmitting module according to a first embodiment of the present invention. Referring to FIG. 1, a transmitting module 100 includes at least two shafts 110, 120 and a conveyer belt 130. The shafts 110, 120 each has a circumference surface 112 and multiple first fixing structures 114, and the first fixing structures 114 are arranged in a row encircling the circumference surface 112. The conveyer belt 130 encircles the shafts 110, 120, and the conveyer belt 130 rotates along with rotation of the shafts 110, 120. The conveyer belt 130 has a body 132 and multiple second fixing structures 134, and the second fixing structures 134 are disposed on a bottom surface 132 of the body 132. A part of the second fixing structures 134 engage with a part of the first fixing structures 114.

Specifically, a material of the conveyer belt 130 may be rubber, and the second fixing structures 134 and the body 132 are formed integrally. Moreover, the shape of the second fixing structures 134 fits with the shape of the first fixing structures 114, so that the second fixing structures 134 are well-engaged with the first fixing structures 114. In this embodiment, the first fixing structures 114 are protrusions, and the second fixing structure 134 are recesses, where the protrusions are rectangular bumps, the protrusions are arranged in a battlement shape on the circumference surface 112, the recesses are rectangular through holes, and the recesses are disposed at positions corresponding to the protrusions. In other embodiments not shown, the first fixing structures 114 may also be circular salient points and the second fixing structures 134 may be circular blind holes, and the salient points are engaged in the blind holes correspondingly. Alternatively, the first fixing structures 114 may be recesses, and the second fixing structures 134 may be protrusions, which depends on the requirements. In addition, one shaft 110 (or 120) is a driving shaft, and the other shaft 120 (or 110) is a driven shaft.

Accordingly, when the transmitting module 100 is operating, illustration is made by taking the shafts 110 connected to a power source as an example. The power source may be a motor, and the operation of the motor impels the shaft 110 serving as the driving shaft to drive the conveyer belt 130 to rotate, thereby driving the shaft 120 serving as the driven shaft to rotate. Specifically, the first fixing structures 114 being the protrusions are embedded in the second fixing structures 134 being the recesses correspondingly, so that no speed difference is generated between the conveyer belt 130 and the shaft 120, the conveyer belt 130 will not skid with respect to the shaft 120, and therefore, the conveying of objects is controlled. Moreover, the first fixing structures 114 being the protrusions may be designed to be bilateral symmetrical, which further increases the fixing effect between the conveyer belt 130 and the shaft 110 (or 120), and the conveyer belt 130 will not snake in an axial direction A of the shaft 110 (or 120).

Second Embodiment

Figure 2:
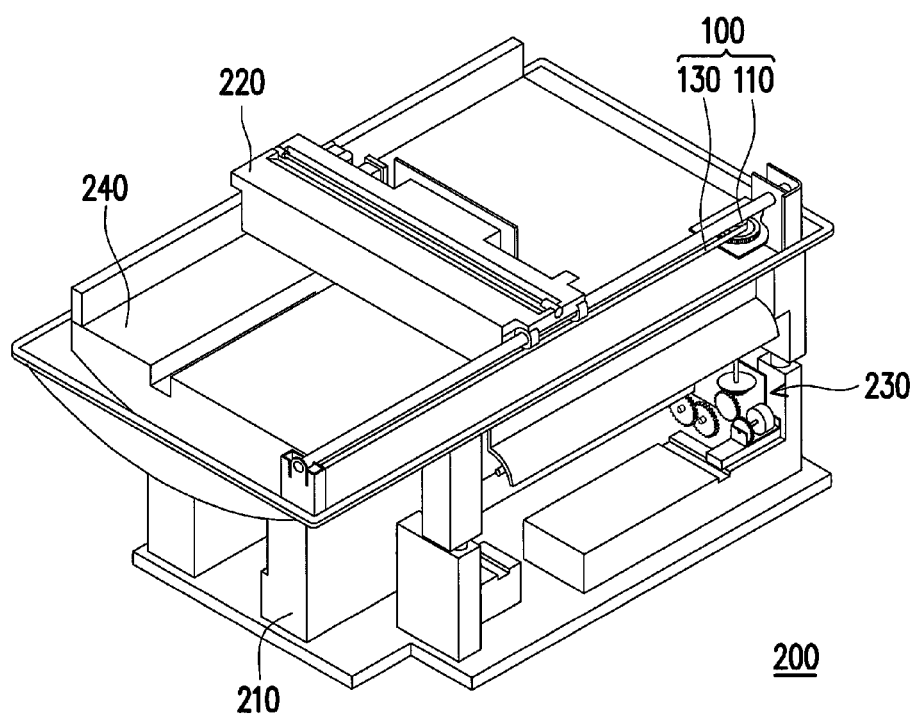
FIG. 2 is a schematic view of a second embodiment of the present invention.

FIG. 2 is a schematic view of a second embodiment of the present invention. In this embodiment, the transmitting module in FIG. 1 is applied in an MFP, and cooperates with a scanning module of the MFP, so as to provide the function of scanning. Referring to FIG. 1 and FIG. 2, an MFP 200 in this embodiment includes a main body 210, a scanning module 220, a driving module 230, the transmitting module 100 according to the first embodiment, and a scanning platform 240. The scanning module 220, the driving module 230, the scanning platform 240 and the transmitting module 100 are all disposed in the main body 210. The scanning module 220 is disposed on the scanning platform 240, and the transmitting module 100 is located beside the scanning platform 240 and connected between the driving module 230 and the scanning module 220. The transmitting module 100 is suitable for driving the scanning module 220 to rotate with respect to the scanning platform 240.

Specifically, the driving module 230 is a combination of a motor and gears. One shaft 110 of the transmitting module 100 is connected to the driving module 230, and the other shaft is not shown in FIG. 2. The scanning module 220 is connected to the conveyer belt 130, and the scanning module 220 is driven by the rotation of the conveyer belt 130.

When performing a scanning procedure, the driving module 230 starts to operate, and then drives the shaft 110 of the transmitting module 100 to drive the conveyer belt 130 to rotate, and the scanning module 220 is driven by the conveyer belt 130 to move with respect to the scanning platform 240, so as to perform the scanning procedure.

In the transmitting module 100, the conveyer belt 130 and the shaft 110 have no speed difference and have desired fixing effect, and the conveyer belt 130 will not skid nor snake along the shaft 110, so the scanning procedure performed by using the MFP 200 may obtain the scanning effect with desired quality.

Third Embodiment

Figure 3:
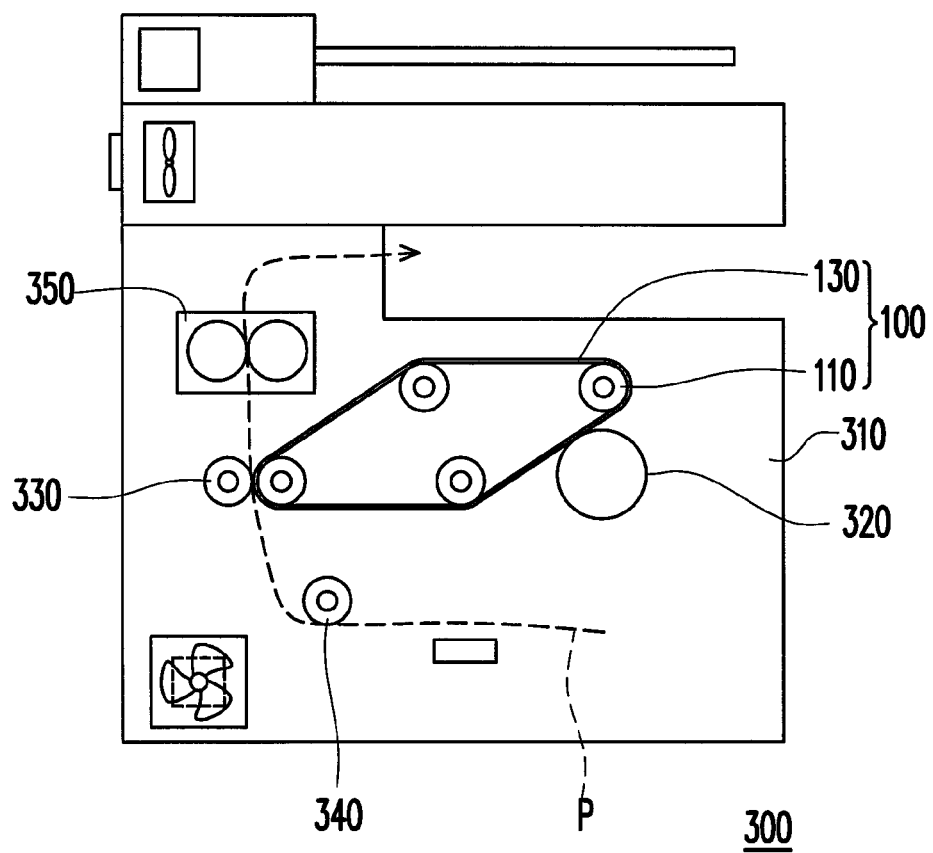
FIG. 3 is a schematic view of a third embodiment of the present invention.

FIG. 3 is a schematic view of a third embodiment of the present invention. In this embodiment, the transmitting module in FIG. 1 is applied in an MFP, and cooperates with a transfer roller and a photoreceptor drum assembly, so as to provide the function of printing.

Referring to FIG. 1 and FIG. 3, an MFP 300 of this embodiment includes a main body 310, the transmitting module 100, a photoreceptor drum assembly 320, and a transfer roller 330. In this embodiment, the transmitting module 100 has 4 shafts 110, and for clarity of the drawing, the shafts are all labelled by 110. The conveyer belt 130 of the transmitting module 100 contacts with the photoreceptor drum assembly 320 and the transfer roller 330 respectively, but the photoreceptor drum assembly 320 has no physical contact with the transfer roller 330.

Moreover, the MFP 300 further has a pick up roller 340 and a paper heating element 350. The pick up roller 340, the paper heating element 350, the transfer roller 330 and the transmitting module 100 together define a paper transmission path P. Specifically, the pick up roller 340 enables a paper to enter the paper transmission path P, and pass through the transfer roller 330 and the paper heating element 350 sequentially for printing. Further, the pick up roller 340 drives the paper (not shown) to move to the transfer roller 330 along the paper transmission path P, and after carbon powder is distributed on the paper through the cooperation of the photoreceptor drum assembly 320, the conveyer belt 130 of the transmitting module 100, and the transfer roller 116, the paper is transmitted to the paper heating element 350 for being heated, so that the carbon powder may be fixed on the paper.

The conveyer belt 130 and the shafts 110 of the transmitting module 100 have no speed difference, and fixing effect between the conveyer belt 130 and the shafts 110 is good, so the delivery of the carbon powder is well controlled, and the conveyer belt 130 will not snake along the shafts 110. Therefore, the printing procedure performed by using the MFP 300 may obtain desired printing quality.

The second and third embodiments are only examples for illustrating the possible applications of the transmitting module, and the present invention is not limited thereto. The transmitting module of the present invention may be applied in any situation requiring avoiding the conveyer belt to snake with respect to the shaft, for example, conveying of a precise object, so as to prevent the precise object from being damaged due to collision of inner parts caused by shaking.

In view of the above, in the transmitting module of the present invention, the engagement between the first fixing structures of the shafts and the second fixing structures of the conveyer belt enable the conveyer belt and the shafts to have desired fixing effect, thereby preventing the conveyer belt from snaking with respect to the shafts during the operation of the transmitting module. The transmitting module is applied in the MFP, and together with the use of the scanning module, the MFP is enabled to have a desired scanning effect; together with the use of the printing module (such as the transfer roller, the photoreceptor drum assembly and the heating element), the MFP is enabled to have a desired printing effect. Moreover, the transmitting module may be further applied to the conveying of other precise products, so as to prevent the precise products from being damaged due to collision of inner parts caused by shaking of the conveyer belt, thereby improving the yield of the precise products before delivery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmitting module, comprising:
   at least two shafts, wherein each shaft comprises a circumference surface and multiple first fixing structures, and the first fixing structures are arranged in a row encircling the circumference surface; and
   a conveyer belt, encircling the shafts, wherein the conveyer belt comprises a body and multiple second fixing structures, the second fixing structures are arranged in a row on a bottom of the body, and when the conveyer belt rotates along with the shafts, the second fixing structures engage with the first fixing structures correspondingly.

2. The transmitting module according to claim 1, wherein one of the shafts is a driving shaft, and the other one of the shafts is a driven shaft.

3. The transmitting module according to claim 1, wherein the first fixing structures are protrusions while the second fixing structures are recesses, or the first fixing structures are recesses while the second fixing structures are protrusions.

4. The transmitting module according to claim 3, wherein the protrusions are of a bilateral symmetrical shape.

5. The transmitting module according to claim 3, wherein the protrusions are arranged in a battlement shape.

6. The transmitting module according to claim 3, wherein the protrusions are bumps or salient points, and the recesses are blind holes or through holes.

7. The transmitting module according to claim 1, wherein the second fixing structures and the body are formed integrally.

8. The transmitting module according to claim 1, wherein a material of the conveyer belt is rubber.

9. A multi-functional printer (MFP), comprising:
   a main body;
   a scanning module, disposed on the main body;
   a driving module, disposed on the main body;
   a transmitting module, connected between the driving module and the scanning module, wherein the transmitting module comprises:
   at least two shafts, wherein each shaft comprises a circumference surface and multiple first fixing structures, and the first fixing structures are arranged in a row encircling the circumference surface; and
   a conveyer belt, encircling the shafts, rotating along with rotation of the shafts, and driving the scanning module, wherein the conveyer belt comprises a body and multiple second fixing structures, the second fixing structures are arranged in a row on a bottom of the body, and when the conveyer belt rotates along with the shafts, the second fixing structures engage with the first fixing structures correspondingly.

10. The MFP according to claim 9, wherein one of the shafts is a driving shaft, and the other one of the shafts is a driven shaft.

11. The MFP according to claim 9, wherein the first fixing structures are protrusions while the second fixing structures are recesses, and the first fixing structures are recesses while the second fixing structures are protrusions.

12. The MFP according to claim 11, wherein the protrusions are of a bilateral symmetrical shape.

13. The MFP according to claim 11, wherein the protrusions are arranged in a battlement shape.

14. The MFP according to claim 11, wherein the protrusions are bumps or salient point, and the recesses are blind holes or through holes.

15. The MFP according to claim 9, wherein the second fixing structures and the body are formed integrally.

16. The MFP according to claim 9, wherein a material of the conveyer belt is rubber.

17. A multi-functional printer (MFP), comprising:
   a main body;
   a transmitting module, disposed in the main body, wherein the transmitting module comprises:
   at least two shafts, wherein each shaft comprises a circumference surface and multiple first fixing structures, and the first fixing structures are arranged in a row encircling the circumference surface;
   a conveyer belt, encircling the shafts, and rotating along with rotation of the shafts, wherein the conveyer belt comprises a body and multiple second fixing structures, the second fixing structures are arranged in a row on a bottom of the body, and when the conveyer belt rotates along with the shafts, the second fixing structures engage with the first fixing structures correspondingly;
   a photoreceptor drum assembly, disposed in the main body, and contacting with the conveyer belt; and
   a transfer roller, disposed in the main body, and contacting with the conveyer belt.

18. The MFP according to claim 17, wherein one of the shafts is a driving shaft, and the other one of the shafts is a driven shaft.

19. The MFP according to claim 17, wherein the first fixing structures are protrusions while the second fixing structures are recesses, or the first fixing structures are recesses while the second fixing structures are protrusions.

20. The MFP according to claim 19, wherein the protrusions are of a bilateral symmetrical shape.

21. The MFP according to claim 19, wherein the protrusions are arranged in a battlement shape.

22. The MFP according to claim 19, wherein the protrusions are bumps or salient point, and the recesses are blind holes or through holes.

23. The MFP according to claim 17, wherein the second fixing structures and the body are formed integrally.

24. The MFP according to claim 17, wherein a material of the conveyer belt is rubber.

25. The MFP according to claim 17, further comprising a pick up roller and a paper heating element, wherein the transfer roller is located between the pick up roller and the paper heating element.

* * * * *